United States Patent [19]

Abolins et al.

[11] 4,131,598

[45] Dec. 26, 1978

[54] POLYPHENYLENE ETHER COMPOSITION

[75] Inventors: Visvaldis Abolins, Delmar; Gim F. Lee, Jr., Albany, both of N.Y.

[73] Assignee: General Electric Company, Pittsfield, Mass.

[21] Appl. No.: 671,341

[22] Filed: Mar. 29, 1976

[51] Int. Cl.$^2$ .......................... C08K 7/14; C08L 71/04
[52] U.S. Cl. .............................. 260/42.18; 260/45.7 R; 260/874; 260/892; 260/DIG. 24
[58] Field of Search ................ 260/874, 45.7 R, 88.1, 260/42.18

[56] References Cited

U.S. PATENT DOCUMENTS

| | | | |
|---|---|---|---|
| 2,769,804 | 11/1956 | Harison | 260/86.7 |
| 2,903,440 | 9/1959 | Heiligmann | 260/88.1 |
| 2,971,939 | 2/1961 | Baer | 260/45.5 |
| 3,219,626 | 11/1965 | Blanchard et al. | 260/47 |
| 3,257,357 | 6/1966 | Stamatoff | 260/47 |
| 3,257,358 | 6/1966 | Stamatoff | 260/47 |
| 3,306,874 | 2/1967 | Hay | 260/47 |
| 3,306,875 | 2/1967 | Hay | 260/47 |
| 3,336,267 | 8/1967 | Zimmermann et al. | 260/78.5 |
| 3,337,499 | 8/1967 | Bussink et al. | 260/47 |
| 3,342,892 | 9/1967 | Laakso et al. | 260/823 |
| 3,344,166 | 9/1967 | Zinsstag | 260/465.2 |
| 3,382,212 | 5/1968 | Price et al. | 260/47 |
| 3,383,435 | 5/1968 | Cizek | 260/874 |
| 3,384,619 | 5/1968 | Hori et al. | 260/47 |
| 3,440,217 | 4/1969 | Faurote et al. | 260/47 |
| 3,442,885 | 5/1969 | Wieden et al. | 260/47 |
| 3,455,880 | 7/1969 | Kobayashi et al. | 260/47 |
| 3,573,257 | 3/1971 | Nakashio et al. | 260/47 |
| 3,639,656 | 2/1972 | Bennett et al. | 260/47 ET |
| 3,642,699 | 2/1972 | Cooper et al. | 260/47 ET |
| 3,661,848 | 5/1972 | Cooper et al. | 260/47 ET |
| 3,810,863 | 5/1974 | Hatton et al. | 260/40 R |

FOREIGN PATENT DOCUMENTS 7212714  2/1972 Netherlands.

OTHER PUBLICATIONS

U.S. Application S.N. 182,893, Moore et al., filed 9/22/1971, abandoned.

Lyons, *The Chem. & Uses of Fire Retardants* (Wiley, 1970) pp. 317–321.

*Primary Examiner*—Thomas De Benedictis, Sr.
*Attorney, Agent, or Firm*—Morgan, Finnegan, Pine, Foley & Lee

[57] ABSTRACT

Polyphenylene ether compositions are disclosed which comprise a polyphenylene ether resin and a copolymer of a vinyl aromatic compound and an α, β-unsaturated cyclic anhydride.

29 Claims, No Drawings

POLYPHENYLENE ETHER COMPOSITION

BACKGROUND OF THE INVENTION

This invention relates to thermoplastic compositions and more particularly to polyphenylene ether resin compositions.

The term "polyphenylene ether resin" includes a family of polymers well known to those skilled in the art. They are made by a variety of catalytic and non-catalytic processes from the corresponding phenols or reaction derivatives thereof. By way of illustration, certain of the following polyphenylene ethers are discussed in Hay, U.S. Pat. Nos. 3,306,874 and 3,306,875 and in Stamatoff, U.S. Pat. Nos. 3,257,357 and 3,257,358. Also, the Bennett and Cooper patents, U.S. Pat. Nos. 3,639,656, 3,642,699 and 3,661,848 describe processes for the preparation of polyphenylene ethers. In the Hay patents, the polyphenylene ethers are prepared by an oxidative coupling reaction comprising passing an oxygen-containing gas through a reaction solution of a phenol and a metalamine catalyst.

Other disclosures relating to processes using metalamine cataysts are found in Bussink et al, U.S. Pat. No. 3,337,499; Blanchard et al, U.S. Pat. No. 3,219,626; Laakso et al, U.S. Pat. No. 3,342,892; Borman, U.S. Pat. No. 3,344,166; Hori et al, U.S. Pat. No. 3,384,619; Faurote et al, U.S. Pat. No. 3,440,217; and disclosures relating to metal based catalysts which do not include amines, are well known from patents such as Wieden et al, U.S. Pat. No. 3,442,885 (copper amidines); Nakashio et al, U.S. Pat. No. 3,573,257 (metal-alcoholate or phenolate); Kobayashi et al, U.S. Pat. No. 3,455,880 (cobalt chelates); and the like. In the Stamstoff patents, the polyphenylene ethers are produced by reacting the corresponding phenolate ion with an initiator, such as a peroxy acid salt, an acid peroxide, a hypohalite, and the like, in the presence of a complexing agent. Disclosures relating to non-catalytic processes, such as oxidation with lead dioxide, silver oxide, etc., are described in Price et al, U.S. Pat. No. 3,382,212. All of the patents which are mentioned above are incorporated herein by reference.

The Cizek patent, U.S. Pat. No. 3,383,435, discloses compositions of polyphenylene ether resins and styrene resins. The thermoplastic composition disclosed by Cizek may include a rubber-modified styrene resin, as well as crystal polystyrene.

It has now been surprisingly discovered that when the conventional polystyrene and rubber-modified polystyrene resins in these polyphenylene ether compositions are replaced with a copolymer of a vinyl aromatic compound and an α,β-unsaturated cyclic anhydride, the heat distortion temperature of the polyphenylene ether composition, as well as other physical properties, is dramatically increased.

SUMMARY OF THE INVENTION

Accordingly, it is one object of the present invention to provide an improved polyphenylene ether composition.

Another object of this invention is to provide a polyphenylene ether composition having improved physical properties in comparison with conventional polyphenylene ether/polystyrene compositions.

Still another object of the present invention is to provide a polyphenylene ether resin composition having an improved heat distortion temperature in comparison with conventional polyphenylene ether resin/polystyrene compositions.

These and other objects are accomplished herein by providing a thermoplastic composition comprising an intimate admixture of:
(a) a polyphenylene ether resin, and
(b) a copolymer of a vinyl aromatic compound and an α,β-unsaturated cyclic anhydride.

DETAILED DESCRIPTION OF THE INVENTION

Illustrative of the polyphenylene ethers embraced herein are those having the repeating structural unit of the formula:

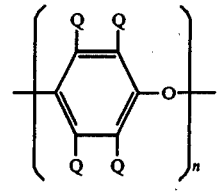

wherein the oxygen ether atom of one unit is connected to the benzene nucleus of the next adjoining unit, n is a positive integer and is at least 50 and each Q is a monovalent substituent selected from the group consisting of hydrogen, halogen, hydrocarbon radicals free of a tertiary α-carbon atom, halohydrocarbon radicals having at least two carbon atoms between the halogen atom and phenyl nucleus and being free of a tertiary α-carbon atoms, hydrocarbonoxy radicals being free of a tertiary α-carbon atom, and halohydrocarbonoxy radicals having at least 2 carbon atoms between the halogen and phenyl nucleus and being free of a tertiary α-carbon atom. Preferred polyphenylene ether resins for purposes of this invention are those having alkyl substitution in the two positions ortho to the oxygen ether atom.

An especially preferred polyphenylene ether resin component herein is poly(2,6-dimethyl-1,4-phenylene) ether.

The vinyl aromatic compound-α,β-unsaturated cyclic anhydride copolymers embraced within the scope of this invention include unmodified copolymers, i.e., non-rubber-modified copolymers, as well as the high impact rubber-modified copolymers. In general, the copolymers of this invention are prepared by conventional bulk solution or emulsion techniques using free-radical initiation. For example, styrene-maleic anhydride copolymers can be obtained by simply reacting the two monomers, i.e., styrene and maleic anhydride, at 50° C. in the presence of benzoyl peroxide. The rate of polymerization may be better controlled if a solvent such as acetone, benzene or xylene is used. Procedures for the preparation of vinyl aromatic/α,β unsaturated cyclic anhydride copolymers may also be found in U.S. Pat. No. 2,971,939, U.S. Pat. No. 3,336,267 and U.S. Pat. No. 2,769,804 which are incorporated herein by reference. The rubber modified copolymers are described in Netherlands 7,212,714 which is also incorporated herein by reference.

The vinyl aromatic compound component from which the copolymer is formed may be derived from compounds of the formula:

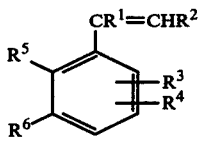

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group. These compounds are free of any substituent that has a tertiary carbon atom. Styrene is the preferred vinyl aromatic compound.

The $\alpha,\beta$-unsaturated cyclic anhydrides from which the copolymers herein are formed may be represented by the formula:

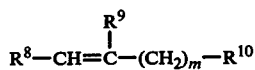

wherein $R^8$ and $R^9$ taken together represent a

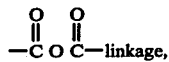

$R^{10}$ is hydrogen, vinyl, alkyl or alkenyl of 1–12 carbon atoms and m is a number from 0 to about 10. The $\alpha,\beta$-unsaturated cyclic anhydrides include maleic anhydride, citraconic anhydride, itaconic anhydride, aconitic anhydride and the like. The preferred $\alpha,\beta$-unsaturated cyclic anhydride is maleic anhydride.

The rubber employed in preparing the rubber-modified copolymers of a vinyl aromatic compound and an $\alpha,\beta$-unsaturated cyclic anhydride may be a polybutadiene rubber, butyl rubber, styrene-butadiene rubber, acrylonitrile rubber, ethylene-propylene copolymers, natural rubber, EPDM rubbers and the like.

These copolymers may comprise 40 to 1 parts by weight of the $\alpha,\beta$-unsaturated cyclic anhydride, from 60 to 99 parts by weight of a vinyl aromatic compound and from 0 to 25 parts by weight of rubber. The preferred polymers will contain about 25–5 parts by weight of the $\alpha,\beta$-unsaturated cyclic anhydride, 75–95 parts by weight of the vinyl aromatic compound and 10 parts by weight of rubber.

Typical commercially available vinyl aromatic/$\alpha,\beta$-unsaturated cyclic anhydride copolymer produces include the SMA resins, sold by Sinclair Petrochemicals, Inc., Lytron and Stymer S resins sold by Monsanto Chemical Company and Dylark resins sold by Sinclair/Koppers Company.

More particularly, the SMA resins are low molecular weight styrene-maleic anhydride copolymers, ranging in molecular weight from 700 to about 1900. The Lytron resins are partially esterified styrene-maleic anhydride copolymers ranging in molecular weight from 1500 to about 50,000. The Stymer S resins are sodium salts of styrene-maleic anhydride copolymer.

A preferred unmodified vinyl aromatic-$\alpha,\beta$-unsaturated cyclic anhydride copolymer useful herein is Dylark 232. Dylark 232 is sold by the Sinclair-Koppers Company and is a styrene-maleic anhydride copolymer containing about 11% maleic anhydride. A preferred rubber-modified vinyl aromatic-$\alpha,\beta$-cyclic anhydride copolymer useful herein is Dylark 240 which is also available from Sinclair-Koppers and is a high impact styrene-maleic anhydride copolymer containing 9–10% rubber and 9% maleic anhydride.

The polyphenylene ether resin and the vinyl aromatic/$\alpha,\beta$-unsaturated cyclic anhydride resins described hereinabove are combinable with each other in all proportions. Consequently, compositions comprising from 1 to 99 parts by weight ether and from 99 to 1 parts, by weight, vinyl aromatic/$\alpha,\beta$-unsaturated cyclic anhydride copolymer are included within the scope of this invention. More particularly, compositions containing from about 30 to 85 parts polyphenylene ether and from 70 to 15 parts copolymer exhibit the best overall combination of properties.

The compositions of the present invention may also include reinforcing fillers, such as aluminum, iron or nickel, and the like, and non-metals such as carbon filaments, silicates, such as aluminum silicate, asbestos, titanium dioxide, zinc oxide, zinc sulfide, potassium titanate and titanate whiskers, glass flakes and glass fibers. Glass fibers are particularly preferred herein.

These reinforcing fillers can be present in amounts ranging from aout 1 to about 80% by weight of the total composition. For best results, however, the fillers are preferably present in amounts ranging from about 10 to about 40% by weight of the total compositions.

A particularly preferred embodiment of this invention is to provide flame retardant thermoplastic compositions, as defined above, by modifying the composition to include a flame-retardant additive in a minor proportion but in an amount at least sufficient to render the composition non-burning or self-extinguishing. Any of the well-known flame-retardants may be used herein. Particularly preferred flame retardants include triphenylphosphate.

The composition of the present invention may be prepared in any conventional manner. For example, a preferred method comprises mixing the polymers in powder or granular form, extruding the mixture into strands, chopping the strands into pellets and molding the pellets into the desired shape.

The improved compositions of this invention are useful for all purposes for which polyphenylene ether compositions have heretofore been used. For example, they may be employed as films, fibers and molding compositions.

The following examples are given so that those skilled in the art may better know how to practice the present invention. These examples are given by way of illustration only and are not to be construed as limiting in any way.

EXAMPLE I 35 parts by weight of poly(2,6-dimethyl-1,4-phenylene) ether having an intrinsic viscosity of about 0.5 at 25° C. in chloroform (PPO, General Electric Co.) is intimately admixed with 65 parts by weight of Dylark 240, high impact grade (a rubber-modified styrene-maleic anhydride copolymer containing 9% maleic anhydride and 9–10% rubber), in a blender. The mixture is blended, extruded, and the extruded strands are chopped into pellets. The pellets are molded into test specimens on a molding machine.

EXAMPLE II

The following composition is prepared similarly to the procedure of Example I.

| Ingredient | Parts by Weight |
| --- | --- |
| poly(2,6-dimethyl-1,4-phenylene)ether* | 35 |
| Dylark 240 | 65 |
| triphenylphosphate | 9 |
| polyethylene M-710 (process aid) | 1.5 |
| tridecylphosphite (stabilizer) | 0.5 |
| zinc sulfide | 0.15 |
| zinc oxide | 0.15 |
| (PPO, General Electric Company) | |

Test specimens of this composition are found to have the following physical properties:

| | | | |
| --- | --- | --- | --- |
| Tensile Strength Yield (psi) | | | 8900 |
| Elongation (%) | | | 32 |
| Izod Impact Strength (ft.lb./in.n) | | | 2.6 |
| Gardner Impact Strength (in. lb.) | | | 56 |
| Heat Distortion Temperature (° F) | | | 210 |
| UL-94 (sec.) | 12 | 8 | 12 |
| | 20, | 32, | 19 |

COMPARATIVE EXAMPLE A

The following composition is prepared similarly to the procedure set forth in Example I.

| Ingredient | Parts by Weight |
| --- | --- |
| poly(2,6-dimethyl-1,4-phenylene)ether (PPO) | 35 |
| rubber-modified, high impact styrene resin* | 65 |
| triphenylphosphate | 7 |
| polyethylene M-710 | 1.5 |
| tridecylphosphite | 0.5 |
| zinc sulfide | 0.15 |
| zinc oxide | 0.15 |

*Foster Grant 834 high impact polystyrene (8% polybutadiene in the form of a polystyrene grafted dispersion of elastomeric particles)

Test specimens of this composition are found to have the following physical properties:

| | | | |
| --- | --- | --- | --- |
| Tensile Strength Yield (psi) | | | 6500 |
| Elongation (%) | | | 67 |
| Izod Impact Strength (ft. lb./in. n.) | | | 5.0 |
| Gardner Impact Strength (in.lb.) | | | 202 |
| Heat Distortion Temperature (° F) | | | 196 |
| UL-94 (sec.) | 52 | 18 | 27 |
| | 4, | 25, | 26 |

By comparing the data of Example II with Example A, it can be readily appreciated that by substituting the rubber-modified high impact styrene resin of the prior art with the vinyl aromatic compound-α,β-unsaturated cyclic anhydride copolymer of this invention, a dramatic increase in the heat distortion temperature of the polyphenylene ether resin composition is realized.

EXAMPLE III

The following composition is prepared similarly to the procedure of Example I.

| Ingredient | Parts by Weight |
| --- | --- |
| poly(2,6-dimethyl-1,4-phenylene)ether resin (PPO) | 35 |
| Dylark 240 | 65 |
| Triphenylphosphate | 10 |
| Polyethylene M-710 | 1.5 |
| Tridecylphosphite | 0.5 |
| Zinc sulfide | 0.15 |
| Zinc oxide | 0.15 |

Test specimens of this composition are found to have the following physical properties:

| | | | |
| --- | --- | --- | --- |
| Tensile strength yield (psi) | | | 8900 |
| Elongation (%) | | | 29 |
| Izod Impact Strength (ft.lb./in.n.) | | | 2.8 |
| Gardner Impact Strength (in lb.) | | | 52 |
| Heat Distortion Temperature (° F) | | | 208 |
| UL-94 (sec.) | 2 | 4 | 10 |
| | 14, | 14, | 120 |

EXAMPLE IV AND COMPARATIVE EXAMPLE B

The following compositions are prepared similarly to the procedure of Example I.

| Ingredient | Example IV (parts by weight) | Example B (parts by weight) |
| --- | --- | --- |
| poly(2,6-dimethyl-1,4,-phenylene) ether resin (PPO) | 50 | 50 |
| Foster Grant (FG) 834 polystyrene | — | 50 |
| Dylark 240 | 50 | — |
| Triphenylphosphate | 3.0 | 3.0 |
| Tridecylphosphite | 0.5 | 0.5 |
| Polyethylene M-710 | 1.5 | 1.5 |
| Zinc oxide | 0.15 | 0.15 |
| Zinc sulfide | 0.15 | 0.15 |
| Titanium dioxide | 5.0 | 5.0 |
| Physical Properties | | |
| Tensile Strength Yield (psi) | 11,400 | 9,400 |
| Tensile Strength Ult. (psi) | 8,900 | 8,500 |
| Elongation (%) | 25 | 59 |
| Flexural Strength (psi) | 18,160 | 13,770 |
| Flexural Modulus (psi) | 463,400 | 326,200 |
| Notch Izod Impact Str. (ft.lb./in.n.) | 2.9 | 3.5 |
| Heat Distortion Temp. (° F) | 261 | 242 |
| Gloss | 60 | 53 |
| Yellowness Index | 21.2 | 22.0 |
| Flammability UL94, 1/16" | fails | fails |

By comparing the data in Examples IV with comparative Example B, it can be readily appreciated by those skilled in the art that the substitution of the vinyl aromatic compound-α,β-unsaturated cyclic anhydride copolymer of this invention (Dylark 240) for the rubber-modified styrene resin of the prior art (FG834) results in a dramatic increase of the heat distortion temperature, higher stiffness (flexural modulus), higher strength and gloss in the polyphenylene ether resin composition.

EXAMPLE V

The following composition is prepared similarly to Example 1.

| Ingredient | Parts by Weight |
| --- | --- |
| poly(2,6-dimethyl-1,4-phenylene ether) resin (PPO) | 35 |
| Dylark 240 | 65 |
| triphenylphosphate | 7.0 |
| tridecylphosphite | 0.5 |
| Polyethylene M-710 | 1.5 |
| Zinc oxide | 0.15 |
| Zinc sulfide | 0.15 |
| titanium dioxide | 5.0 |
| Physical Properties | |

-continued

| Ingredient | Parts by Weight |
| --- | --- |
| Tensile Strength Yield (psi) | 9,900 |
| Tensile Strength Ult (psi) | 7,600 |
| Elongation (%) | 26 |
| Flexural Strength (psi) | 14,150 |
| Flexural Modulus (psi) | 407,800 |
| Notch Izod Impact Str. (ft.lb./in.n.) | 2.3 |
| Heat Distortion Temp. (° F) | 225 |
| Gloss | 58 |
| Yellowness Index | 19.7 |
| Flammability UL 94, 1/16" | fails |

EXAMPLE VI AND COMPARATIVE EXAMPLE C

The following compositions are prepared similarly to the procedure of Example 1:

| Ingredient | Example VI (parts by weight) | Comparative Example C (parts by weight) |
| --- | --- | --- |
| poly(2,6-dimethyl-1,4 phenylene) ether resin (PPO) | 45 | 45 |
| Foster Grant 834 polystyrene | — | 55 |
| Dylark 240 | 55 | — |
| triphenyl phosphate | — | — |
| tridecylphosphite | 1.0 | 1.0 |
| Polyethylene M-710 | 1.5 | 1.5 |
| Zinc Oxide | 0.15 | 0.15 |
| Zinc Sulfide | 0.15 | 0.15 |
| Physical Properties | | |
| Tensile Strength yield (psi) | 10,500 | 8,300 |
| Tensile Strength Ult. (psi) | 8,300 | 7,900 |
| Elongation (%) | 32 | 61 |

-continued

| Ingredient | Example VI (parts by weight) | Comparative Example C (parts by weight) |
| --- | --- | --- |
| Flexural Strength (psi) | 17,000 | 12,200 |
| Flexural Modulus (psi) | 418,700 | 331,000 |
| Notch Izod Impact Strength (ft.lb./in.n) | 2.4 | 3.2 |
| Heat Distortion Temperature (° F) | 264 | 246 |
| Gloss | 50.6* | 42.9* |
| Yellowness | 65.2 | 59.7 |

*0.25 in. × 2.5 in. × 2.5 in. sample.

By comparing Example VI with Example C, it can be readily appreciated that substitution of Dylark 240 for Foster Grant's 834 results in almost 20° F. higher heat distortion temperature as well as other improved physical properties.

EXAMPLES VII, VIII AND COMPARATIVE EXAMPLE D

The following examples are prepared similarly to Example I

| Ingredient | Comparative Example D (parts by wt.) | Example VII (parts by weight) | Example VIII (parts by weight) |
| --- | --- | --- | --- |
| PPO | 35 | 35 | — |
| FG834 polystyrene | 45 | — | — |
| Dylark 240 | — | 45 | 80 |
| 497 BB glass fibers* | 20 | 20 | 20 |
| Physical Properties | | | |
| Tensile Str. Ult. (psi) | 13,100 | 12,400 | 10,400 |
| Elongation (%) | 6 | 5 | 4 |
| Flexural Strength (psi) | 21,600 | 20,500 | 17,400 |
| Flexural Modulus (psi) | 679,700 | 784,200 | 817,600 |
| Unnotch Izod Imp. Str.(ft.lb./in.) | 7.7 | 5.5 | 4.5 |
| Notch Izod Imp.Str. (ft.lb./in.n.) | 1.9 | 1.3 | 1.3 |
| Heat Distortion Temp. (° F) | 275 | 288 | 238 |

*Chopped glass reinforcing fibers

EXAMPLES IX AND X AND COMPARATIVE EXAMPLE E

The following Examples are prepared similarly to Example I.

| Ingredient | Comparative Example E (parts by wt.) | Example IX (parts by weight) | Example X (parts by weight) |
| --- | --- | --- | --- |
| PPO | 35 | 35 | — |
| FG834 polystyrene | 45 | — | — |
| Dylark 232* | — | 45 | 80 |
| 497 BB glass fibers | 20 | 20 | 20 |
| Physical Properties | | | |
| Tensile Str. Ult. (psi) | 13,100 | 14,200 | 11,000 |
| Elongation (%) | 6 | 4 | 3 |
| Flexural Strength (psi) | 21,600 | 22,900 | 18,300 |
| Unnotch Izod Imp. str.(ft.lb./in.) | 7.7 | 5.2 | 4.1 |
| Notch Izod Imp. Str. (ft.lb./in.n.) | 1.9 | 1.2 | 1.1 |
| Heat Distortion Temp. (° F) | 275 | 290 | 236 |

*styrene-maleic anhydride copolymer containing 11% maleic anhydride

By comparing Examples VII-X with Comparative Examples D and E, it can be readily appreciated that the compositions of this invention offer superior physical properties, particularly superior heat distortion temperatures.

Furthermore, while some of the data hereinabove may indicate that some of the compositions fail the stringent UL-94 flammability tests, those skilled in the art will recognize that these compositions are nonetheless flame-retardant according to other standards.

Obviously, other modifications and variations of the present invention are possible in light of the above teachings. For example, additives, other than those already mentioned, such as plasticizers and pigments, may also be included in the present compositions. It is therefore to be understood that changes may be made in the particular embodiments of the invention described which are within the full intended scope of the invention as defined by the appended claims.

What is claimed and desired to be secured by Letters Patent is:

1. A thermoplastic composition comprising:
   (a) a polyphenylene ether resin; and
   (b) a copolymer of a vinyl aromatic compound and an α,β-unsaturated cyclic anhydride.

2. The composition as defined in claim 1 wherein the polyphenylene ether resin is of the formula:

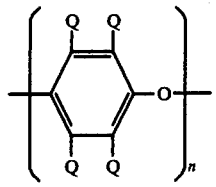

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of tertiary α-carbon atoms, halohydrocarbon radicals having at least two carbon atoms between the halogen atom and phenyl nucleus and being free of a tertiary α-carbon atom, hydrocarbonoxy radicals being free of a tertiary α-carbon atom and halohydrocarbonoxy radicals having at least two carbon atoms between the halogen atom and phenyl nucleus and being free of a tertiary α-carbon atom.

3. The composition as defined in claim 1 wherein said vinyl aromatic compound is derived from the formula

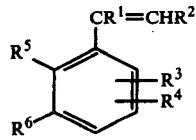

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group, said compounds being free of any substituent that has a tertiary carbon atom; and wherein said α,β-unsaturated cyclic anhydride is represented by the formula:

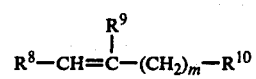

wherein $R^8$ and $R^9$ taken together represent

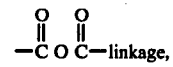

$R^{10}$ is hydrogen, vinyl, alkyl or alkenyl of 1–12 carbon atoms, and m is a number from 0 to 10.

4. The composition as defined in claim 1 wherein the said copolymer is a rubber-modified vinyl aromatic-/α,β-unsaturated cyclic ahydride copolymer.

5. The composition as defined in claim 1 wherein said thermoplastic composition contains from about 1 to about 99 parts by weight of said polyphenylene ether resin and from about 99 to about 1 parts by weight of said copolymer.

6. The composition as defined in claim 1 wherein said thermoplastic composition contains from about 30 to about 60 parts by weight polyphenylene ether resin and from about 40 to about 70 parts by weight said copolymer.

7. The composition as defined in claim 1 wherein the polyphenylene ether is poly(2,6-dimethyl-1,4-phenylene)ether.

8. The composition as defined in claim 1 which further comprises a filler.

9. The composition as defined in claim 1 which further comprises a flame retardant additive.

10. The composition as defined in claim 1 which further comprises a filler and a flame-retardant additive.

11. A thermoplastic composition comprising:
    (a) a polyphenylene ether resin; and
    (b) a rubber-modified vinyl aromatic compound-α,β-unsaturated cyclic anhydride copolymer.

12. The composition as defined in claim 11 wherein said vinyl aromatic compound is derived from the formula

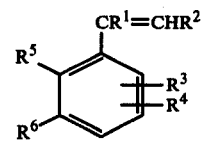

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group, said compounds being free of any substituent that has a tertiary carbon atom; and wherein said α,β-unsaturated cyclic anhydride represented by the formula

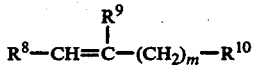

wherein $R^8$ and $R^9$ taken together represent a

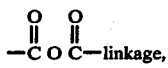

$R^{10}$ is hydrogen, vinyl, alkyl or alkenyl of 1–12 carbon atoms and m is a number from 0 to 10.

13. The composition as defined in claim 11 wherein said polyphenylene ether is poly(2,6-dimethyl-1,4 phenylene) ether.

14. The composition as defined in claim 11 which further comprises a reinforcing filler.

15. The composition as defined in claim 11 wherein said polyphenylene ether resin comprises from about 30 to about 60 parts by weight of the total composition and said rubber-modified styrene-maleic anhydride copolymer comprises from about 40 to 70 parts by weight of the total composition.

16. The composition as defined in claim 11 which further comprises a reinforcing filler and a flame-retardant additive.

17. The composition as defined in claim 14 wherein said reinforcing filler is glass.

18. A thermoplastic composition comprising:
    (a) a polyphenylene ether resin;
    (b) a styrene-maleic anhydride copolymer; and
    (c) a reinforcing filler.

19. The composition as defined in claim 18 wherein said styrene-maleic anhydride copolymer is a rubber-modified styrene-maleic anhydride copolymer.

20. The composition as defined in claim 18 wherein said reinforcing filler is glass.

21. The composition as defined in claim 19 wherein said reinforcing filler is glass.

22. The composition as defined in claim 19 wherein polybutadiene is the modifying rubber.

23. The composition as defined in claim 21 wherein polybutadiene is the modifying rubber.

24. The composition as defined in claim 18 further comprising a flame-retardant additive.

25. The composition as defined in claim 19 further comprising a flame-retardant additive.

26. The composition as defined in claim 18 wherein said polyphenylene ether resin is poly(2,6-dimethyl-1,4 phenylene)ether.

27. The composition as defined in claim 19 wherein said polyphenylene ether resin is poly(2,6-dimethyl-1,4 phenylene) ether.

28. The composition as defined in claim 26 wherein said reinforcing filler is glass.

29. The composition as defined in claim 27 wherein said reinforcing filler is glass.

* * * * *

UNITED STATES PATENT OFFICE
CERTIFICATE OF CORRECTION

Patent No. 4,131,598　　　　　　　　Dated December 26, 1978

Inventor(s) Visvaldis Abolins et al

It is certified that error appears in the above-identified patent and that said Letters Patent are hereby corrected as shown below:

In Col. 6, at approximately line 38, under "Elongation (%)", "25" should read -- 26 --.

In Col. 8, at approximately line 60, under "Ingredient" and after "Flexural Strength (psi)" but before "Unnotch Izod Imp.", the following line should be inserted:

-- Flexural Modulus
　　(psi)　　　　　679,700　　　　883,000　　　　888,300 --

Signed and Sealed this

Seventeenth Day of April 1979

[SEAL]

Attest:

RUTH C. MASON
Attesting Officer

DONALD W. BANNER
Commissioner of Patents and Trademarks